United States Patent
Kim et al.

(10) Patent No.: US 10,704,912 B2
(45) Date of Patent: Jul. 7, 2020

(54) ROUTE GUIDANCE SERVICE APPARATUS

(71) Applicant: SK Planet Co., Ltd., Seongnam-si, Gyeonggi-do (KR)

(72) Inventors: Kicheol Kim, Seoul (KR); GeumBeom Song, Seongnam-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 697 days.

(21) Appl. No.: 15/336,822

(22) Filed: Oct. 28, 2016

(65) Prior Publication Data

US 2017/0122745 A1    May 4, 2017

(30) Foreign Application Priority Data

Oct. 28, 2015    (KR) .................. 10-2015-0150192
Oct. 29, 2015    (KR) .................. 10-2015-0150874

(51) Int. Cl.
*G01C 21/20* (2006.01)
*H04W 4/024* (2018.01)
*H04W 4/33* (2018.01)
*G01C 21/36* (2006.01)
*H04W 4/02* (2018.01)

(52) U.S. Cl.
CPC ....... *G01C 21/206* (2013.01); *G01C 21/3638* (2013.01); *H04W 4/024* (2018.02); *H04W 4/027* (2013.01); *H04W 4/33* (2018.02)

(58) Field of Classification Search
CPC . G01C 21/206; G01C 21/3638; H04W 4/027; H04W 4/04; H04W 4/33; H04W 4/024
See application file for complete search history.

(56) References Cited

U.S. PATENT DOCUMENTS

| | | | | |
|---|---|---|---|---|
| 6,323,807 | B1* | 11/2001 | Golding | G01C 21/20 342/419 |
| 8,233,008 | B2* | 7/2012 | Jin | G06T 19/20 345/619 |
| 8,825,387 | B2* | 9/2014 | Mays | G01C 21/20 701/433 |
| 2010/0023252 | A1 | 1/2010 | Mays et al. | |
| 2014/0365119 | A1* | 12/2014 | Haverinen | G01C 21/206 701/500 |

FOREIGN PATENT DOCUMENTS

CN    101241606    8/2008

OTHER PUBLICATIONS

National Intellectual Property Administration, Chinese Patent Application No. 2016/10971982.8, 15 pages.

* cited by examiner

*Primary Examiner* — Nadeem Odeh
*Assistant Examiner* — Michael V Kerrigan
(74) *Attorney, Agent, or Firm* — Fenwick & West LLP

(57) ABSTRACT

A route guidance service apparatus includes: a checking unit configured to check a particular floor in a destination building based on a destination keyword; a calculation unit configured to calculate an output level of the particular floor based on building information related to the destination building so as to distinguish the particular floor from other floors; and a control unit configured to perform a control operation such that floor information related to the particular floor is separately arranged at a position adjacent to the destination building when the particular layer is selected.

9 Claims, 11 Drawing Sheets

[route guidance service apparatus]

ROUTE GUIDANCE SERVICE APPARATUS

CROSS-REFERENCE TO RELATED APPLICATIONS

The instant application is based on and claims priority to Korean Patent Application No. 10-2015-0150874, filed on Oct. 29, 2015, and Korean Patent Application No. 10-2015-0150192, filed on Oct. 28, 2015. The disclosure of above-listed applications is hereby incorporated by reference herein in their entirety.

TECHNICAL FIELD

This invention relates to a technique for intuitively recognizing floor information (e.g., indoor map) related to a particular floor in a destination building.

In addition, this invention relates to a technique for identifying a position of a terminal device in a building formed of plural floors based on an acoustic signal only when inter-floor movement occurs in the building.

BACKGROUND ART

Technical Background

In recent years, with the improvement in functionality of mobile devices (hereinafter referred to as "terminal devices"), the number of users who use route guidance services in addition to communication services (e.g., calling, messaging, etc.) are rapidly increasing.

A route guidance service may include, e.g., a navigation service, a way-finding (indoor routing) service, a geographic information guidance service, etc. When a user of a terminal device inputs an origin and a destination through an application, the route guidance service can be executed in such a way that a route guidance service apparatus checks a moving route of the terminal device, creates route guidance information related to the moving route, and delivers the created route guidance information to the terminal device.

In this case, the route guidance information may include map data showing surrounding areas (e.g., roads, buildings, etc.) related to the moving route of the terminal device.

However, such map data have a limitation in that, since only the overall appearance of a building set as a destination (hereinafter referred to as a destination building) is simply displayed on the map data, the map data cannot provide information about a particular floor in the destination building to be visited by a user.

Accordingly, there is a need for a technique for intuitively recognizing a particular floor in a destination building to be visited by a user.

The route guidance service apparatus checks a position of the terminal device based on a GPS (Global Positioning System) signal received from the terminal device and performs a control operation such that a route guidance screen corresponding to the checked position is displayed on the terminal device.

However, when the current position of the terminal device is identified depending on the GPS signal thus, there is a difficulty in correctly identifying a position of the terminal device when the terminal device is moved between floors in a building consisting of plural floors.

SUMMARY

It is therefore an object of the present invention to provide a route guidance service apparatus which is capable of easily selecting a particular floor to be visited by a user on map data and quickly checking floor information (e.g., an indoor map) related to the particular floor by performing a control operation such that the floor information (e.g., an indoor map) related to the particular floor in a destination building is intuitively recognized.

It is another object of the present invention to provide a route guidance service apparatus which is capable of more correctly providing a floor in which a terminal device is currently located in a building by identifying a position of the terminal device in the building based on an acoustic signal only when movement of the terminal device between floors occurs in the building consisting of plural floors.

To achieve the above objects, according to one aspect of the present invention, there is provided a route guidance service apparatus including: a checking unit configured to check a particular floor in a destination building based on a destination keyword; a calculation unit configured to calculate an output level of the particular floor based on building information related to the destination building so as to distinguish the particular floor from other floors; and a control unit configured to perform a control operation such that floor information related to the particular floor is separately arranged at a position adjacent to the destination building when the particular layer is selected.

The building information may include at least one of the total number of floors for the destination building and the floor information related to the floor, and the floor information may be an indoor map including at least one of position information corresponding to shops located in the particular floor and fixture information.

The calculation unit may calculate the output level of the particular floor based on a second color different from a first color of the destination building.

When the particular floor is selected, the control unit may determine an expression way to separately arrange the floor information at a first position adjacent to the destination building through a slide fashion.

When the floor information separately arranged through the slide fashion is again selected, the control unit may perform a control operation such that the selected floor information is slid into the destination building so as not to be displayed on map data.

The control unit may perform a control operation such that a search area is arranged at a second position adjacent to the destination building so as to search other floors.

According to another aspect of the present invention, there is provided an operation method of a route guidance service apparatus, including: checking a particular floor in a destination building based on a destination keyword; calculating an output level of the particular floor based on building information related to the destination building so as to distinguish the particular floor from other floors; and performing a control operation such that floor information related to the particular floor is separately arranged at a position adjacent to the destination building when the particular layer is selected.

The step of performing a control operation may include determining an expression way to separately arrange the floor information at a first position adjacent to the destination building through a slide fashion.

The step of performing a control operation may include, when the floor information separately arranged through the slide fashion is again selected, performing a control operation such that the selected floor information is slid into the destination building so as not to be displayed on map data.

According to another aspect of the present invention, there is provided a route guidance service apparatus including: a checking unit configured to check sensor measurement information of a terminal device; a decision unit configured to decide whether or not the terminal device is moved between floors in a building based on the sensor measurement information; and a determination unit configured to determine a position of the terminal device in the building based on an acoustic signal sensed in the terminal device only when the movement between floors occurs.

The sensor measurement information may include at least one of horizontal movement information and acceleration information.

When an acceleration pattern is checked based on the acceleration information, the decision unit may decide whether or not the terminal device is moved through a stair based on building information related to the building.

When the acceleration pattern is not checked, the decision unit may decide that the terminal device is got in an elevator when a change in acceleration of the terminal device is checked based on the acceleration information and a change in position of the terminal device in the horizontal direction is not checked based on the horizontal movement information, and, when the acceleration pattern is not checked, the decision unit may decide that the terminal device is got in an escalator when a change in position of the terminal device in the horizontal direction is checked and a change in vibration of the terminal device is not checked based on the acceleration information.

The determination unit may detect floor information from the acoustic signal and detect a particular floor in the building based on the floor information.

The determination unit may determine a position of the terminal device as the particular floor.

According to the present invention, it is possible to provide a route guidance service apparatus which is capable of easily selecting a particular floor to be visited by a user on map data and quickly checking floor information (e.g., an indoor map) related to the particular floor by performing a control operation such that the floor information (e.g., an indoor map) related to the particular floor in a destination building is intuitively recognized.

According to the present invention, it is possible to provide a route guidance service apparatus which is capable of more correctly providing a floor in which a terminal device is currently located in a building by identifying a position of the terminal device in the building based on an acoustic signal only when movement of the terminal device between floors occurs in the building consisting of plural floors.

DETAILED DESCRIPTION

Figure 1:
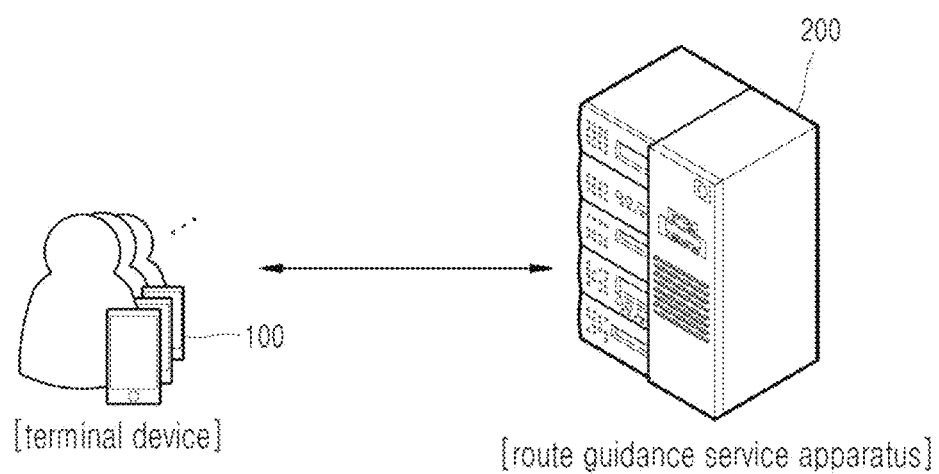
FIG. 1 is a view illustrating the general configuration of a route guidance service system according to a first embodiment of the present invention.

The technical terms used in the specification are just provided to describe specific embodiments and are not intended to limit the technical ideas of the present invention. In addition, the technical terms used in the specification should be construed to have the meanings understood by those skilled in the art to which the present invention belongs, unless stated otherwise, and should not be construed to have unduly extensional meanings or unduly intentional meanings. In addition, even when the technical terms used in the specification are incorrect technical terms that cannot precisely express the technical ideas of the present invention, the incorrect technical terms should be replaced with correct ones and understood by those skilled in the art. In addition, the generic terms used in the specification should be construed in the dictionary definition or in the context and should not be construed to have unduly extensional meanings or unduly intentional meanings.

In addition, the singular form used in the specification is intended to include the plural form unless stated otherwise. The term "comprise" or "include" used in the specification should not be necessarily construed to include all of elements or steps described in the specification but may be construed to exclude some elements or steps or further include additional elements or steps.

In addition, an ordinal number such as "first," "second" or the like used in the specification may be used to describe a variety of elements but should not be used to limit these elements. The ordinal number is just used to distinguish one element from another. For example, a first element may be named as a second element and vice versa without departing the technical scope of the present invention.

Hereinafter, some embodiments of the present invention will be described in detail with reference to the accompanying drawings. Throughout the drawings, the same or similar elements are denoted by the same reference numerals and explanation of which will not be repeated.

In the following detailed description of the present invention, concrete description on related functions or constructions will be omitted if it is deemed that the functions and/or constructions may unnecessarily obscure the gist of the present invention. In addition, it should be noted that the accompanying drawings are just provided for the purpose of easy understandings of the technical ideas of the present invention but are not intended to limit the technical ideas.

Hereinafter, a first embodiment of the present invention will be described with reference to the accompanying drawings.

FIG. 1 is a view illustrating the general configuration of a route guidance service system according to a first embodiment of the present invention.

Referring to FIG. 1, the route guidance service system according to the first embodiment of the present invention includes a terminal device 100 using a route guidance service, and a route guidance service apparatus 200 which offers the route guidance service to the terminal device 100.

The terminal device 100 refers to a device in which an application related to the route guidance service is installed.

In this embodiment, the route guidance service may be a navigation service, a way-finding (indoor routing) service, a geographic information guidance service, etc. When a user of the terminal device 100 inputs an origin and a destination through an application, the route guidance service is executed in such a way that the route guidance service apparatus 200 checks a moving route of the terminal device 100, creates route guidance information related to the moving route, and delivers the created route guidance information to the terminal device 100. The following description will be given on the assumption that the route guidance service is a navigation service for the convenience of description.

When using the route guidance service, the terminal device 100 uses a GPS (Global Positioning System) or the like to check its own current position in order to deliver position information related to the current position to the route guidance service apparatus 200.

The terminal device 100 may be a portable device such as a smartphone, tablet PC, PDA, notebook or the like, or a separate device installed in a vehicle. However, without being limited thereto, the terminal device 100 may include all of devices in which an application related to the navigation service can be installed.

The route guidance service apparatus 200 refers to a server which services route guidance to the terminal device 100.

The route guidance service apparatus 200 checks the moving route of the terminal device 100 based on the origin and the destination input from the terminal device 100, creates the route guidance information corresponding to the checked moving route, and offers the created route guidance information to the terminal device 100.

In this case, the route guidance information may include map data showing surrounding areas (e.g., roads, buildings, etc.) related to the current position of the terminal device 100.

However, such map data have a limitation in that, since only the overall appearance of a building set as a destination (hereinafter referred to as a destination building) is simply displayed on the map data, the map data cannot provide information about a particular floor in the destination building to be visited by a user.

That is, since only the appearance of the destination building can be checked through route guidance information and floor information (e.g., an indoor map) related to a particular floor to be visited by a user cannot be checked, it takes an additional time to check the floor information.

In the end, there is a difficulty in distinguishing a particular floor to be visited from other floors in the destination building. In addition, since the floor information (e.g., an indoor map) related to the particular floor cannot be quickly checked, it takes much time for a user to reach the particular floor in the destination building.

Accordingly, the first embodiment of the present invention suggests a technique for quickly checking floor information (e.g., an indoor map) related to a particular floor in a destination building. Hereinafter, the route guidance service apparatus 200 for implementing this technique will be described in detail.

Figure 2:
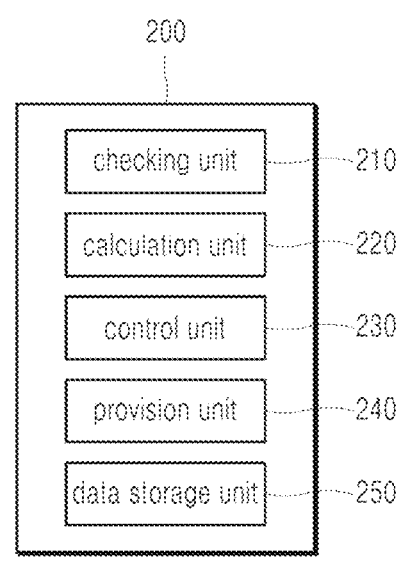
FIG. 2 is a view illustrating the general configuration of a route guidance service apparatus according to the first embodiment of the present invention.

FIG. 2 is a view illustrating the general configuration of the route guidance service apparatus 200 according to the first embodiment of the present invention.

Referring to FIG. 2, the route guidance service apparatus 200 according to the first embodiment of the present invention includes a checking unit 210 which checks a particular floor in a destination building based on a destination key word, a calculation unit 220 which calculates an output level of the particular floor based on building information related to the destination building so as to distinguish the particular floor from other floors, a control unit 230 which performs a control operation such that floor information related to the particular floor is separately arranged at a position adjacent to the destination building, and a provision unit 240 which provides map data.

In addition, the route guidance service apparatus 200 may further include a data storage unit 250 which stores basic map data information required to provide the route guidance service, and building information related to buildings shown in the map data information.

That is, in the present invention, when there exists building information related to buildings shown in the map data information, the building information is stored with it mapped to the buildings.

Accordingly, when the building information of the building displayed in the map data information exists, the position information and the building information of the building are mapped and stored. When the building information of the building displayed in the map data information does not exist, only the position information of the building is stored.

In this embodiment, the building information includes at least one of the total number of floors forming the destination building and floor information related to the floors. In this case, the floor information may be an indoor map including at least one of position information corresponding to shops located every floor and fixture information (e.g., corridors, elevators, etc.).

The above-described configuration of the route guidance service apparatus 200 including the check unit 210, the calculation unit 220, the control unit 230, the provision unit 240 and the data storage unit 250 can be implemented in the form of software modules executed by a processor, individually or in combination.

The checking unit 210 performs the function to check a particular floor in the destination building based on a destination key word.

More specifically, upon receiving the destination keyword from the terminal device 100, the checking unit 210 detects a particular position (e.g., a floor number, a room number, etc.) to be visited by a user from the destination keyword.

At this time, the destination keyword may include not only basic information (e.g., an address, a telephone number, etc.) for route guidance information but also a particular position (e.g., a floor number, a room number, etc.) in the destination building to be visited by a user.

Accordingly, the checking unit 210 can check a particular floor in the destination building to be visited, based on the particular position (e.g., a floor number, a room number, etc.). Thereafter, the checking unit 210 informs the calculation unit 220 that there exists a particular floor to be distinguished from other floors in the destination building.

Based on the building information related to the destination building, the calculation unit 220 performs the function to calculate an output level of the particular floor so as to distinguish the particular floor from other floors.

More specifically, the calculation unit 220 detects the position information of the destination building from the stored map data information. Subsequently, the calculation unit 220 uses the building information mapped to the position information of the destination building to identify the total number of floors of the destination building.

Thereafter, the calculation unit 220 calculates an output level of the particular floor so as to distinguish the particular floor from other floors in the destination building.

Specifically, the calculation unit 220 checks a first color of the destination building on the map data and calculates the output level of the particular floor based on a second color different from the first color.

It should be, here, noted that the second color is complementary to the first color for the purpose of visibility enhancement but may not be complementary to the first color as long as the particular floor can be distinguished from other floors in the destination building.

Figure 3A:
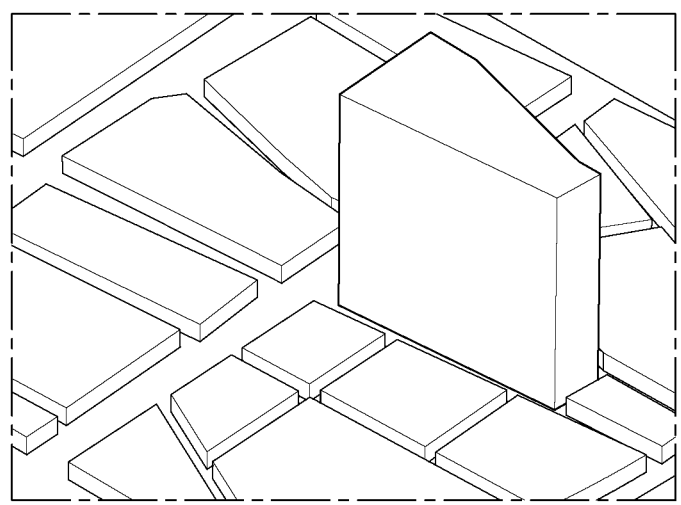
FIG. 3A is a view illustrating one example of a destination building according to the first embodiment of the present invention.
Figure 3B:
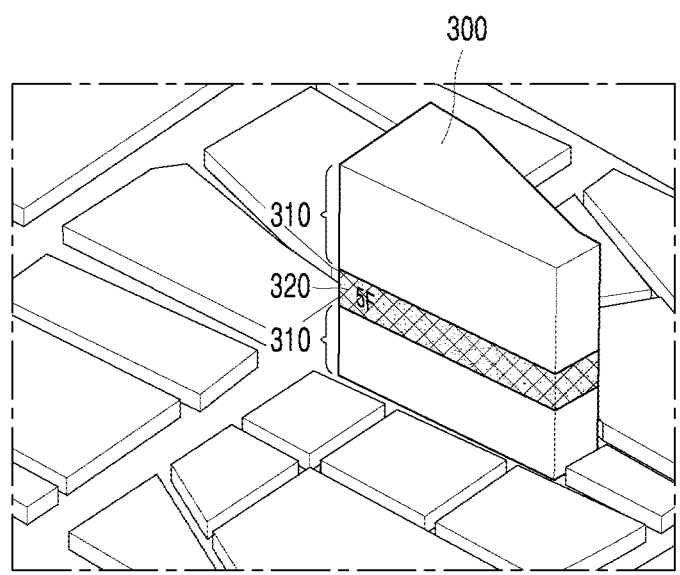
FIG. 3B is a view illustrating one example of a destination building with a particular floor whose color is different with that of the destination building according to the first embodiment of the present invention.

In this connection, FIG. 3A and FIG. 3B illustrates one example of a destination building with a particular floor whose output level is varied, according to the first embodiment of the present invention.

As illustrated in FIG. 3A, in the first embodiment of the present invention, the destination building may be displayed with the first color on the map data until the particular floor to be visited is identified.

When the particular floor to be visited is identified, the calculation unit 220 determines the second color different from the first color of the destination building and calculates the output level of the particular floor based on the second color.

Accordingly, as illustrated in FIG. 3B, the particular floor 320 is displayed with the second color different from the first color of other floors 310 of the destination building 300.

The control unit 230 performs the control function to the floor information related to the particular floor is separately arranged at a position adjacent to the destination building.

More specifically, when the particular floor is selected by a user under a state where the particular floor is displayed on the map data so as to be distinguished from other floors on the map data as described above, the control unit 230 determines an expression way to arrange the floor information related to the particular floor at a first position adjacent to the destination building in a slide fashion.

Here, the slide fashion may be modified into different forms along axes (x, y, z) in the sliding direction. As one example, the slide fashion may be a drawer fashion. In the first embodiment of the present invention, the drawer fashion may be an expression way in which the floor information related to the particular floor is slid so as to be arranged at a position adjacent to the destination building, as if a drawer is opened, and the floor information related to the particular floor is slid into the destination building so as not to be displayed on the map data, as if a drawer is closed.

Although the slide fashion has been illustrated with the drawer fashion in the first embodiment of the present invention, the present invention is not limited thereto. For example, the present invention may employ different slide fashions, such as a fashion where the floor information is slid while being rotated around the axes (x, y, z) in the sliding direction, a fashion where the floor information is slid as if pages of a book are turned over, a fashion where the floor information is slid while being horizontally moved at a predetermined interval (e.g., being horizontally bobbled), etc., in order to display the floor information separately at a position adjacent to the destination building.

Figure 4:
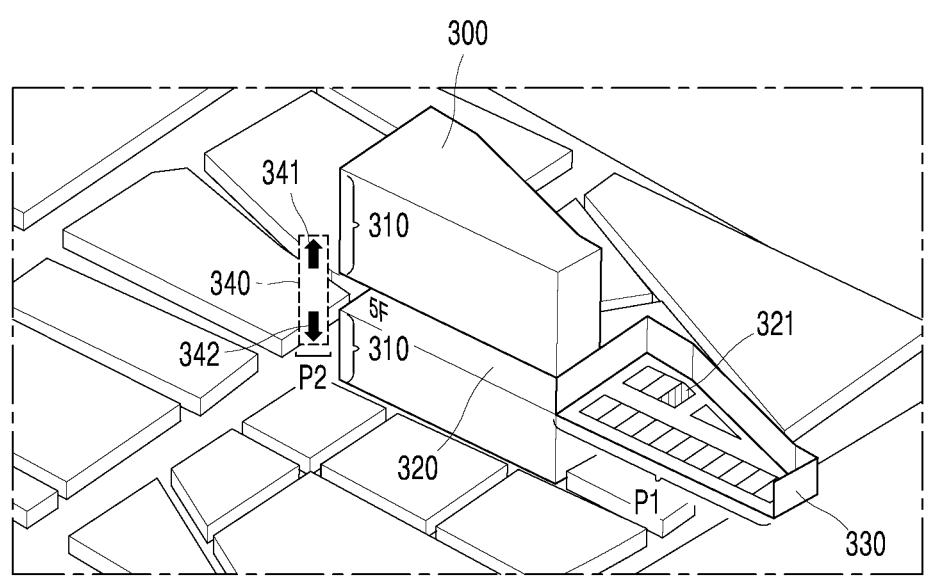
FIG. 4 is a view illustrating one example of an expression way of floor information related to a particular layer, according to the first embodiment of the present invention.

In this connection, FIG. 4 illustrates one example of the expression way of the floor information related to the particular layer according to the first embodiment of the present invention.

As illustrated in FIG. 4, in the first embodiment of the present invention, when the particular floor 320 of the destination building 300 is selected by the user under a state where the particular floor 320 is displayed on the map data so as to be distinguished from other floors 310, the control unit 230 determines the expression way as the slide fashion.

Accordingly, the floor information 330 related to the particular floor 320 is slid to and separately arranged at the first position P1 adjacent to the destination building 300 through the slide fashion.

At this time, the first position P1 may be determined as a position in a separation range within which the association of the floor information 330 with the particular floor 320 of the destination building 300 can be intuitively recognized.

In this way, the indoor map including the position information corresponding to shops located in the particular floor 320, the fixture information (e.g., corridors, elevators, etc.) and so on can be displayed in the floor information 330 slid to the first position P1.

Accordingly, the user can preview the particular position (e.g., a floor number, a room number, etc.) 321 to be visited and the fixture information (e.g., corridors, elevators, etc.) available until the user reaches the particular position (e.g., a floor number, a room number, etc.) 321.

When the floor information 330 is again selected by the user under a state where the floor information 330 is separately arranged through the slide fashion, the control unit 230 performs a control operation such that the selected floor information 330 is slid into the destination building 300, as if a drawer is closed, so as not to be displayed on the map data.

That is, as the control operation is performed such that the floor information 330 is not arranged at the first position P1 adjacent to the particular floor 320, the destination building 300 is displayed as shown in FIG. 3B.

That the floor information related to the particular floor to be visited is displayed on the map data has been illustrated in the above. Hereinafter, a process of searching other floors in the destination building will be described in more detail.

The control unit 230 performs a control operation such that a search area is arranged at a second position adjacent to the destination building to search other floors in the destination building.

In this embodiment, the search area may be a touch/click area associated with movement between floors so that floor information for each of other floors in the destination building can be displayed at a position adjacent to the corresponding floor.

Figure 5:
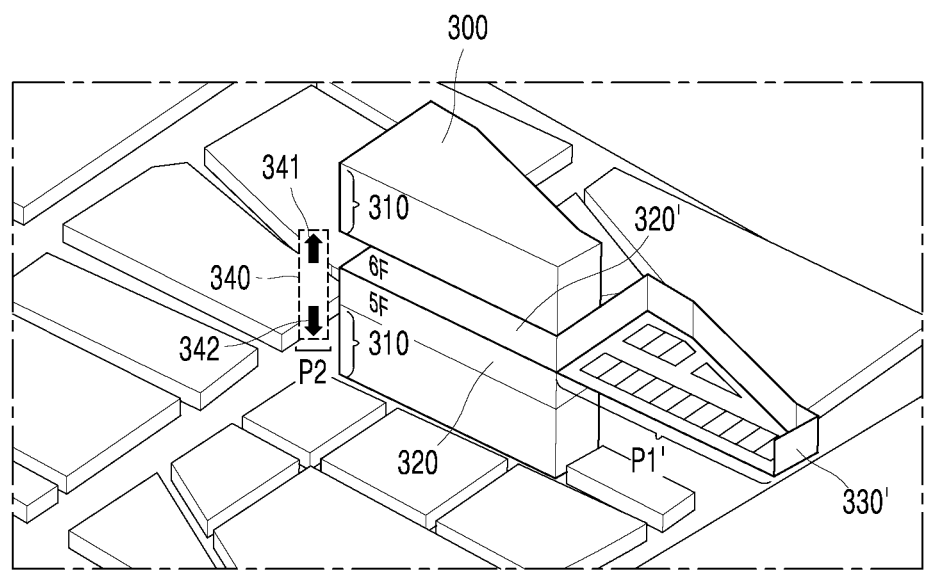
FIG. 5 is a view illustrating one example of map data on which a search area is arranged, according to the first embodiment of the present invention.

In this connection, FIG. 5 illustrates one example of the map data on which a search area is arranged, according to the first embodiment of the present invention.

Referring to FIGS. 4 and 5, in the first embodiment of the present invention, a search area 340 is displayed at the second position P2 on the map data when the above-described floor information 330 related to the particular floor 320 is displayed at the first position P1.

Here, the second position P2 may be determined as a position which is adjacent to the destination building but does not overlap with the first position P1.

In a state where the search area 340 is displayed thus, when some area 341 of the search area 340 is selected by the user, the control unit 230 performs a control operation such that the floor information 330 related to the particular floor 320 is slid into the destination building 300, as if a drawer is closed, so as not to be displayed on the map data.

At this time, in order to indicate that an upper floor 320' immediately above the particular floor 320 is selected by some region 341, the calculation unit 220 calculates an output level of the upper floor 320' based on a third color.

That is, the upper floor 320' is displayed with the third color on the map data. Accordingly, while the particular floor 320 of the destination building 300 is being displayed with the second color, a floor shifted by the search area 340 is displayed with the third color.

At the same time, the control unit 230 performs a control operation such that the floor information 330' related to the upper floor 320' is slid through the slide fashion, as if a drawer is opened, so as to be arranged at the first position P1' adjacent to the upper floor 320'.

When the floor information 330' is again selected by the user under a state where the floor information 330' related to the upper floor 320' is separately arranged through the slide fashion, the control unit 230 performs a control operation such that the selected floor information 330' is slid into the destination building 300, as if a drawer is closed, so as not to be displayed on the map data.

That is, as the control operation is performed such that the floor information 330' is not arranged at the first position P1' adjacent to the upper floor 320', the destination building 300 is displayed as shown in FIG. 3B.

If some area 342 of the search area 340 is selected and the particular floor 320 is again selected in a state where the floor information 330' is arranged at the first position P1', the control unit 230 performs a control operation such that the floor information 330' related to the upper floor 320' is slid into the destination building 300, as if a drawer is closed, so as not to be displayed on the map data.

At the same time, the control unit 230 performs a control operation such that the floor information 330 related to the particular floor 320 is slid through the slide fashion, as if a drawer is opened, so as to be arranged at the first position P1 adjacent to the particular floor 320.

That is, as the control operation is performed such that the floor information 330 is again arranged at the first position P1 adjacent to the particular floor 320, the destination building 300 is displayed as shown in FIG. 4.

As described above, when the floor information related to a particular floor or a floor to be searched is separately arranged at a position adjacent to the destination building on the map data, the control unit 230 performs a control operation to allow the provision unit 240 to stream the map data to the terminal device 100.

As a result, when a particular floor in the destination building to be visited by a user is selected or a search area to search other floors is selected, the provision unit 240 streams the map data on which the floor information related to the selected particular floor or the selected search area is separately arranged, to the terminal device 100.

Figure 6:
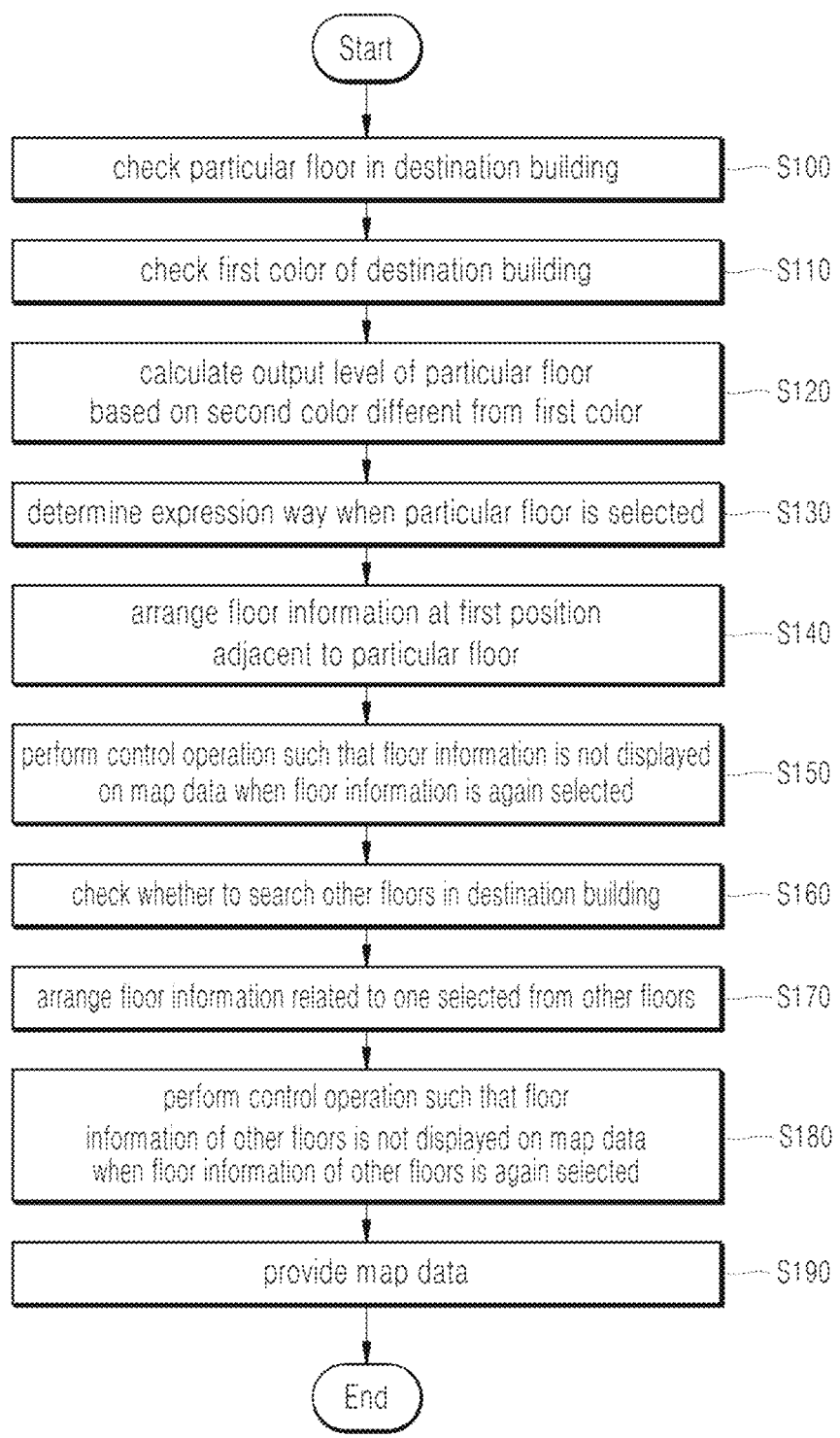
FIG. 6 is a flow chart for explaining a flow of operation in the route guidance service apparatus according to the first embodiment of the present invention.

Hereinafter, a flow of operation in the route guidance service apparatus 200 according to the first embodiment of the present invention will be described with reference to FIG. 6. For the convenience of description, the elements shown in FIGS. 1 to 5 will be referred to with the corresponding reference numerals.

First, upon receiving a destination keyword from the terminal device 100, the checking unit 210 detects a particular position (e.g., a floor number, a room number, etc.) to be visited by a user from the destination keyword (S100).

At this time, the destination keyword may include not only basic information (e.g., an address, a telephone number, etc.) for route guidance information but also a particular position (e.g., a floor number, a room number, etc.) in the destination building to be visited by the user.

Accordingly, the checking unit 210 can check a particular floor in the destination building to be visited, based on the particular position (e.g., a floor number, a room number, etc.). Thereafter, the checking unit 210 informs the calculation unit 220 that there exists a particular floor to be distinguished from other floors in the destination building.

The calculation unit 220 uses building information mapped to position information of the destination building to check the total number of floors of the destination building. Thereafter, the calculation unit 220 calculates an output level of the particular floor so as to distinguish the particular floor from other floors in the destination building.

That is, the calculation unit 220 checks a first color of the destination building on the map data and calculates the output level of the particular floor based on a second color different from the first color (S110 and S120).

It should be, here, noted that the second color is complementary to the first color for the purpose of visibility enhancement but may not be complementary to the first color as long as the particular floor can be distinguished from other floors in the destination building.

When the particular floor is selected by a user under a state where the particular floor is displayed on the map data so as to be distinguished from other floors on the map data as described above, the control unit 230 determines an expression way to arrange the floor information related to the particular floor separately at a first position adjacent to the destination building in a slide fashion (S130). Thereafter, the control unit 230 arranges the floor information related to the particular floor at the first position according to the determined expression way (S140).

Here, the slide fashion may be modified into different forms along axes (x, y, z) in the sliding direction. As one example, the slide fashion may be a drawer fashion. In the first embodiment of the present invention, the drawer fashion may be an expression way in which the floor information related to the particular floor is slid so as to be arranged at a position adjacent to the destination building, as if a drawer is opened, and the floor information related to the particular floor is slid into the destination building so as not be displayed on the map data, as if a drawer is closed.

Although the slide fashion has been illustrated with the drawer fashion in the first embodiment of the present invention, the present invention is not limited thereto. For example, the present invention may employ different slide fashions, such as a fashion where the floor information is slid while being rotated around the axes (x, y, z) in the sliding direction, a fashion where the floor information is slid as if pages of a book are turned over, a fashion where the floor information is slid while being horizontally moved at a predetermined interval (e.g., being horizontally bobbled), etc., in order to display the floor information separately at a position adjacent to the destination building.

When the floor information 330 is again selected by the user under a state where the floor information 330 is separately arranged through the slide fashion as shown in FIG. 4, the control unit 230 performs a control operation such that the selected floor information 330 is slid into the destination building 300, as if a drawer is closed, so as not to be displayed on the map data (S150).

That is, as the control operation is performed such that the floor information 330 is not arranged at the first position P1 adjacent to the particular floor 320, the destination building 300 is displayed as shown in FIG. 3B.

That the floor information related to the particular floor to be visited is displayed on the map data has been illustrated in the above. Hereinafter, a process of searching other floors in the destination building will be described in more detail.

The control unit 230 performs a control operation such that a search area is arranged at a second position adjacent to the destination building to search other floors in the destination building.

In this embodiment, the search area may be a touch/click area associated with movement between floors so that floor information for each of other floors in the destination building can be displayed at a position adjacent to the corresponding floor.

The search area 340 is displayed at the second position P2 on the map data when the above-described floor information 330 related to the particular floor 320 is displayed at the first position P1, as shown in FIG. 4.

Here, the second position P2 may be determined as a position which is adjacent to the destination building but does not overlap with the first position P1.

It is monitored whether or not some areas 341 and 342 of the search area 340 are selected by the user under a state where the search area 340 is displayed at the second position P2 as described above, to thereby check whether to search other floors (S160).

When some area 341 of the search area 340 is selected by the user at S160, the control unit 230 performs a control operation such that the floor information 330 related to the particular floor 320 is slid into the destination building 300, as if a drawer is closed, so as not to be displayed on the map data.

At this time, in order to indicate that an upper floor 320' immediately above the particular floor 320 is selected by some region 341 as shown in FIG. 5, the calculation unit 220 calculates an output level of the upper floor 320' based on a third color.

That is, the upper floor 320' is displayed with the third color on the map data. Accordingly, while the particular floor 320 of the destination building 300 is being displayed with the second color, a floor shifted by the search area 340 is displayed with the third color.

At the same time, the control unit 230 performs a control operation such that the floor information 330' related to the upper floor 320' is slid through the slide fashion, as if a drawer is opened, so as to be arranged at the first position P1' adjacent to the upper floor 320' (S170).

When the floor information 330' is again selected by the user under a state where the floor information 330' related to the upper floor 320' is separately arranged through the slide fashion, the control unit 230 performs a control operation such that the selected floor information 330' is slid into the destination building 300, as if a drawer is closed, so as not to be displayed on the map data (S180).

That is, as the control operation is performed such that the floor information 330' is not arranged at the first position P1' adjacent to the upper floor 320', the destination building 300 is displayed as shown in FIG. 3B.

If some area 342 of the search area 340 is selected and the particular floor 320 is again selected in a state where the floor information 330' related to the upper floor 320' is arranged at the first position P1', the control unit 230 performs a control operation such that the floor information 330' related to the upper floor 320' is slid into the destination building 300, as if a drawer is closed, so as not to be displayed on the map data.

At the same time, the control unit 230 performs a control operation such that the floor information 330 related to the particular floor 320 is again slid through the slide fashion, as if a drawer is opened, so as to be arranged at the first position P1 adjacent to the particular floor 320.

That is, as the control operation is performed such that the floor information 330 is again arranged at the first position P1 adjacent to the particular floor 320, the destination building 300 is displayed as shown in FIG. 4.

As a result, when a particular floor in the destination building to be visited by a user is selected or a search area to search other floors is selected, the provision unit 240 streams the map data on which the floor information related to the selected particular floor or the selected search area is separately arranged at a position adjacent to the destination building, to the terminal device 100 (S190).

As described above, according to the flow of operation in the route guidance service apparatus 200 according to the first embodiment of the present invention, by performing a control operation such that floor information (e.g., an indoor map) related to a particular floor in a destination building is intuitively recognized, it is possible to easily select a particular floor to be visited by a user on map data and quickly check the floor information (e.g., an indoor map) related to the particular floor.

Hereinafter, a second embodiment of the present invention will be described with reference to the accompanying drawings.

Figure 7:
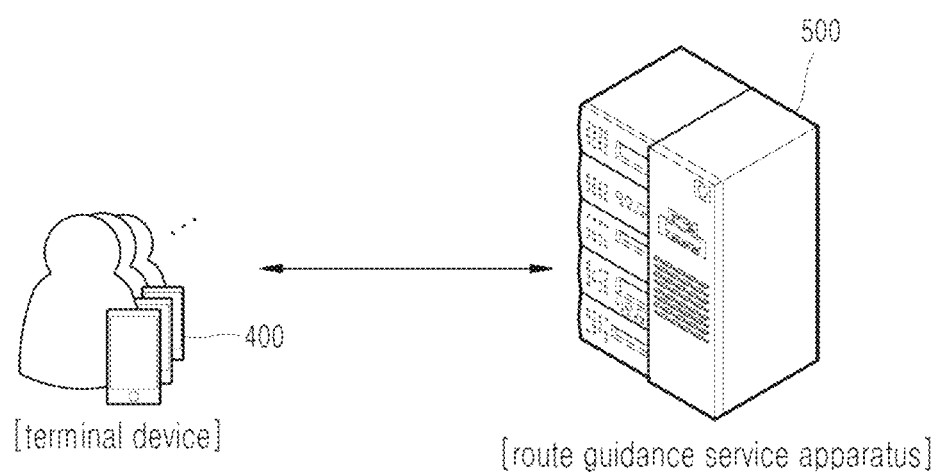
FIG. 7 is a view illustrating the general configuration of a route guidance service system according to a second embodiment of the present invention.

FIG. 7 is a view illustrating the general configuration of a route guidance service system according to a second embodiment of the present invention.

Referring to FIG. 7, the route guidance service system according to the second embodiment of the present invention includes a terminal device 400 using a route guidance service, and a route guidance service apparatus 500 which offers the route guidance service to the terminal device 400.

The terminal device 400 refers to a device in which an application related to the route guidance service is installed.

In this embodiment, the route guidance service may be a navigation service, a way-finding (indoor routing) service, a geographic information guidance service, etc. The following description will be given on the assumption that the route guidance service is an indoor routing service for providing a floor where the terminal device 400 is currently located only when movement of the terminal device 400 between floors in a construction (e.g., a building) which the terminal device 400 enters is checked, for the convenience of description.

The terminal device 400 uses a GPS (Global Positioning System) or the like to check its own current position information and delivers a result of the checking to the route guidance service apparatus 500.

The terminal device 400 may be a portable device such as a smartphone, tablet PC, PDA, notebook or the like. However, without being limited thereto, the terminal device 400 may include all of devices in which an application related to the route guidance service can be installed.

The route guidance service apparatus 500 refers to a server which services route guidance to the terminal device 400.

The route guidance service apparatus 500 checks a floor in which the terminal device 400 is currently located only when movement of the terminal device 400 between floors in a building consisting of a plurality of floors is checked, generates a position of the checked terminal device 400 as indoor route guidance information, and offers the generated information to the terminal device 400.

In this embodiment, the indoor route guidance information refers to guidance information provided to guide a floor in which the terminal device 400 is currently located when movement of the terminal device 400 between floors is checked when an indoor moving route of the terminal device 400 is estimated in the indoor.

The indoor route guidance information may include indoor map data created based on building information in order to display a moving route of the terminal device 400 in a building.

In this embodiment, the building information refers to an indoor map including at least one of position information corresponding to shops in the building, parking lot information (e.g., a parking lot map, the number of floors of a parking lot, a parking mark, etc.) and fixture information (e.g., an elevator, an escalator, a corridor (stair) map, etc.).

In order to provide the indoor map data to the terminal device 400, the route guidance service apparatus 500 has to check whether or not the terminal device 400 enters the building.

As a result, the route guidance service apparatus 500 checks whether or not the terminal device 400 enters the building based on a GPS (Global Positioning System) signal received from the terminal device 400, and provides the indoor map data corresponding to the current position of the terminal device 400 when the terminal device 400 is located in the building.

However, when the current position of the terminal device 400 in the building is checked depending on the GPS signal, there is a limitation that the position of the terminal device 400 cannot be correctly checked when the terminal device 400 is moved between floors in the building consisting of multiple floors.

As a result, since the GPS signal may not be received or may be weakly received in the building, there occurs a problem that the terminal device 400 cannot correctly recognize only with the GPS signal whether the terminal device 400 is located in which floor in the building.

Accordingly, the second embodiment of the present invention suggests a technique for providing a floor in which a terminal device is currently located in a building consisting of multiple floors. Hereinafter, the route guidance service apparatus 500 for implementing this technique will be described in detail.

Figure 8:
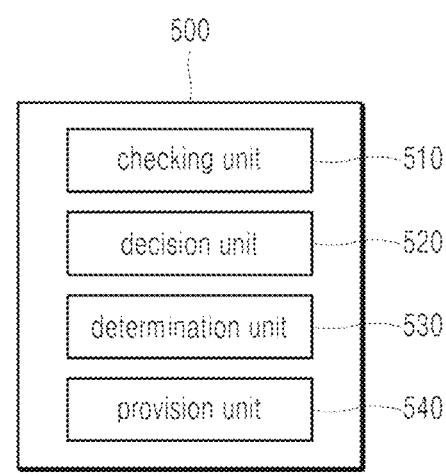
FIG. 8 is a view illustrating the general configuration of a route guidance service apparatus according to the second embodiment of the present invention.

FIG. 8 is a view illustrating the general configuration of the route guidance service apparatus 500 according to the second embodiment of the present invention.

Referring to FIG. 8, the route guidance service apparatus 500 according to the second embodiment of the present invention includes a checking unit 510 which checks sensor measurement information of the terminal device 400, a decision unit 520 which determines whether or not the terminal device 400 is moved between floors in a building based on the sensor measurement information, a determination unit 530 which uses an acoustic signal sensed by the terminal device 400 to detect a position of the terminal device 400 in the building only when the terminal device 400 is moved between floors, and a provision unit 540 which provides indoor map data.

The above-described configuration of the route guidance service apparatus 500 including the check unit 510, the decision unit 520, the determination unit 530 and the provision unit 540 can be implemented in the form of software modules executed by a processor, individually or in combination.

The checking unit 510 performs the function to check the sensor measurement information of the terminal device 400.

More specifically, upon receiving the sensor measurement information from the terminal device 400, the checking unit 510 detects horizontal movement information and acceleration information from the sensor measurement information.

In this connection, the terminal device 400 uses a GPS sensor, an acceleration sensor or the like to generate the sensor measurement information including at least one of the horizontal movement information and the acceleration information.

That is, the terminal device 400 generates the horizontal movement information to check a change in position of the terminal device 400 based on a GPS signal. In addition, the terminal device 400 generates the acceleration information based on an acceleration signal received from the acceleration sensor.

Here, the horizontal movement information is a signal to check a change in position of the terminal device 400 in the building in the horizontal direction based on the GPS signal and the acceleration information is a signal to check a change in acceleration of the terminal device 400 in the building.

At this time, the acceleration information may include first acceleration change information to check a change in acceleration of the terminal device 400 in a first direction (z) and acceleration change information to check a change in acceleration of the terminal device 400 in a second direction (x or y).

Accordingly, the checking unit 510 can detect the horizontal movement information and the acceleration information from the sensor measurement information received from the terminal device 400.

The decision unit 520 performs the function to decide inter-floor movement of the terminal device 400 in the building based on the sensor measurement information.

More specifically, the decision unit 520 checks a certain acceleration pattern based on the acceleration information of the sensor measurement information.

Figure 9:
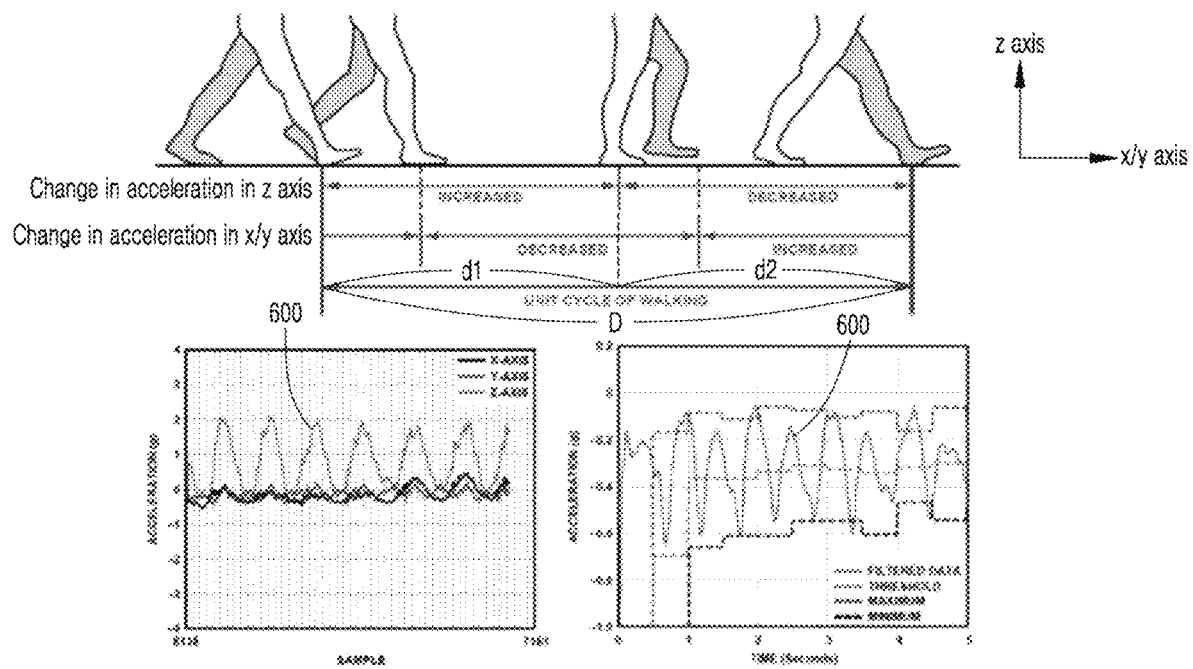
FIG. 9 is a view illustrating one example of an acceleration pattern according to the second embodiment of the present invention.

In this connection, FIG. 9 illustrates one example of the acceleration pattern according to the second embodiment of the present invention.

As illustrated in FIG. 9, a walking cycle D generated by movement of a user of the terminal device 400 according to the second embodiment of the present invention has an acceleration pattern in which an acceleration in the first direction (z) increases while an acceleration in the second direction (x or y) decreases in an interval d1 in which a right foot advances, whereas an acceleration in the first direction (z) decreases while an acceleration in the second direction (x or y) increases in an interval d2 in which a left foot advances.

As a result, an acceleration pattern 600 to check walking by the walking cycle D is generated in walking. Accordingly, the decision unit 520 can decide the acceleration pattern 600 based on the acceleration information generated by walking from the terminal device 400.

Thereafter, the decision unit 520 decides whether or not the terminal device 400 is moving between floors based on a result of checking of the acceleration pattern 600.

First, a method of deciding movement between floors through a stair will be described.

Upon checking the acceleration pattern based on the acceleration information, the decision unit 520 decides that the user of the terminal device 400 is walking and detects building information related to a building.

Here, the building information refers to an indoor map including at least one of position information corresponding to shops in the building, parking lot information (e.g., a parking lot map, the number of floors of a parking lot, a parking mark, etc.) and fixture information (e.g., an elevator, an escalator, a corridor (stair) map, etc.) and may be stored in advance.

Accordingly, based on the horizontal movement information of the terminal device 400, the decision unit 520 decides whether or not a change in position of the terminal device 400 matches a position of the fixture information (e.g., an elevator, an escalator, a corridor (stair) map, etc.).

That is, when the positional change of the terminal device 400 occurs in a place where fixtures are located, the decision unit 520 decides that the terminal device 400 is being moved through a stair.

Next, a method of deciding movement between floors through an elevator will be described.

If the acceleration pattern is not checked based on the acceleration information, the decision unit 520 checks a change in acceleration in the first direction (z) based on the first acceleration change information of the acceleration information.

When the change in acceleration in the first direction (z) is checked, the decision unit 520 checks a positional change in the horizontal direction based on the horizontal movement information.

If the positional change in the horizontal direction is not checked although the acceleration change in the first direction (z) is checked, since this means that the terminal device 400 is vertically being moved in the elevator, the decision unit 520 decides that the terminal device 400 is got in the elevator.

Finally, a method of deciding movement between floors through an escalator will be described.

If the acceleration pattern is not checked based on the acceleration information, the decision unit 520 checks a positional change in the horizontal direction based on the horizontal movement information.

When the positional change in the horizontal direction is checked thus, the decision unit 520 checks a change in vibration of the terminal device 400 based on the first acceleration change information and the second acceleration change information of the acceleration information.

If the change in vibration of the terminal device 400 is not checked although the positional change in the horizontal direction is checked, since this means that the terminal device 400 is being moved in the escalator, the decision unit 520 decides that the terminal device 400 is got in the escalator.

It is to be understood that the decision on movement between floors through the elevator and the escalator may be made based on the position of the fixture information (e.g., an elevator, an escalator, a corridor (stair) map, etc.) of the building information, unlike the above-described process.

When an acoustic signal is detected in the terminal device 400 only when movement between floors occurs, the determination unit 530 performs the function to detect a position of the terminal device 400 in the building using the acoustic signal.

More specifically, when the terminal device 400 is being moved between floors, the determination unit 530 checks whether or not the terminal device 400 has executed an application related to the route guidance service.

That is, when the application related to the route guidance service is being executed in the terminal device 400 and the route guidance service is in use, the determination unit 530 receives the sensed acoustic signal from the terminal device 400.

At this time, the acoustic signal may be an audible frequency band signal containing floor information of a building and is output through a speaker located in each floor.

Accordingly, the determination unit 530 can detect a particular floor that the terminal device 400 in the building reaches after being moved between floors, based on the floor information. Thereafter, the determination unit 530 determines the position of the terminal device 400 in the building as the particular floor.

If it is checked that the application related to the route guidance service is not executed in the terminal device 400, the determination unit 530 generates an execution request signal and delivers this signal to the terminal device 400 to execute the application.

Thereafter, when the application related to the route guidance service is driven in the terminal device 400 and the acoustic signal is sensed, the determination unit 530 uses the acoustic signal to detect the particular floor that the terminal device 400 reaches after being moved between floors, as described above, and performs a process of determining the position of the terminal device 400 as the particular floor, in the same way as described above.

When the particular floor that the terminal device 400 reaches after being moved between floors is checked using the acoustic signal, the control unit 240 performs a control operation such that indoor map data on which the checked particular floor is displayed are provided to the terminal device 400.

As a result, when the application for indoor route guidance is being driven in the terminal device 400, the provision unit 540 displays the particular floor that the terminal device 400 reaches after being moved between floors, on the indoor map data provided in real time. When it is checked that the application is not executed in the terminal device 400, the provision unit 540 activates the application of the terminal device and then provides the indoor map data on which the particular floor that the terminal device 400 reaches after being moved between floors is displayed.

Figure 10:
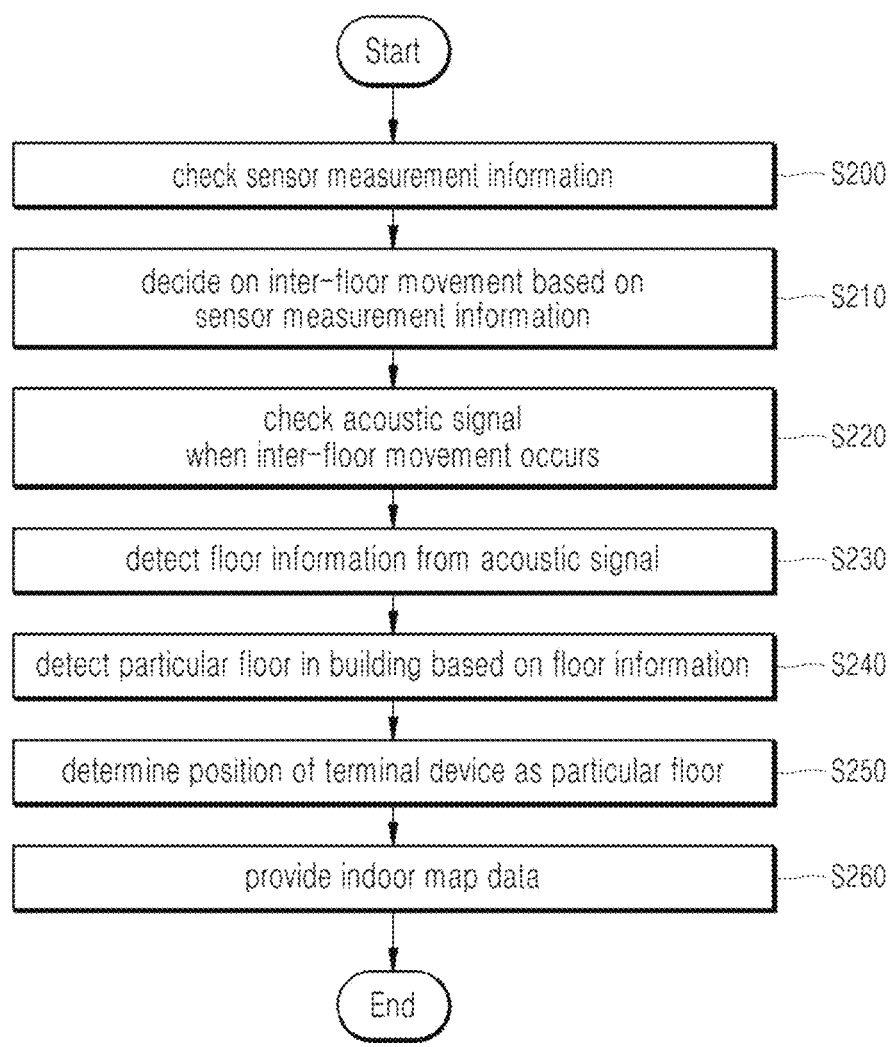
FIG. 10 is a flow chart for explaining a flow of operation in the route guidance service apparatus according to the second embodiment of the present invention.

Hereinafter, a flow of operation in the route guidance service apparatus 500 according to the second embodiment of the present invention will be described with reference to FIG. 10. For the convenience of description, the elements shown in FIGS. 7 to 9 will be referred to with the corresponding reference numerals.

First, upon receiving the sensor measurement information from the terminal device 400, the checking unit 510 detects the horizontal movement information and the acceleration information from the sensor measurement information (S200).

Here, the horizontal movement information is a signal to check a change in position of the terminal device 400 in the building in the horizontal direction based on the GPS signal and the acceleration information is a signal to check a change in acceleration of the terminal device 400 in the building.

At this time, the acceleration information may include first acceleration change information to check a change in acceleration of the terminal device 400 in a first direction (z) and acceleration change information to check a change in acceleration of the terminal device 400 in a second direction (x or y).

The decision unit 520 decides whether or not the terminal device 400 in the building is moved between floors based on the sensor measurement information (S210).

That is, the decision unit 520 checks an acceleration pattern based on the acceleration information of the sensor measurement information. Thereafter, the decision 520 uses the acceleration pattern to decide whether or not the terminal device 400 is being moved between floors.

When it is decided that the terminal device 400 is being moved between floors, the determination unit 530 checks whether or not the terminal device 400 has executed an application related to the route guidance service.

That is, when the application related to the route guidance service is being executed in the terminal device 400 and the route guidance service is in use, the determination unit 530 receives the sensed acoustic signal from the terminal device 400 (S220).

At this time, the acoustic signal may be an audible frequency band signal containing floor information of a building and is output through a speaker located in each floor.

Accordingly, the determination unit 530 can detect a particular floor that the terminal device 400 in the building reaches after being moved between floors, based on the floor information (S240). Thereafter, the determination unit 530 determines the position of the terminal device 400 in the building as the particular floor (S250).

If it is checked that the application related to the route guidance service is not executed in the terminal device 400, the determination unit 530 generates an execution request signal and delivers this signal to the terminal device 400 to execute the application.

Thereafter, when the application related to the route guidance service is driven in the terminal device 400 and the acoustic signal is sensed, the determination unit 530 uses the acoustic signal to detect the particular floor that the terminal device 400 reaches after being moved between floors, as described above, and performs a process of determining the position of the terminal device 400 as the particular floor, in the same way as described above.

When the particular floor that the terminal device 400 reaches after being moved between floors is checked using the acoustic signal, the provision unit 540 provides indoor map data on which the checked particular floor is displayed, to the terminal device 400 (S260).

That is, when the application is being driven in the terminal device 400, the provision unit 540 displays the particular floor on the indoor map data. When it is checked that the application is not executed in the terminal device 400, the provision unit 540 activates the application of the terminal device and then provides the indoor map data on which the particular floor is displayed.

As described above, according to the flow of operation in the route guidance service apparatus 500, it is possible to more correctly provide a floor in which a terminal device is currently located in a building by identifying a position of the terminal device in the building based on an acoustic signal only when movement of the terminal device between floors occurs in the building consisting of plural floors.

The functional operations and subjects described in the specification can be implemented with digital electronic circuits or may be implemented with computer software, firmware or hardware including structures disclosed in the specification and equivalents thereof or in combination thereof. The subjects described in the specification can be implemented with one or more computer program products, in other words, one or more modules related to computer program instructions encoded on a tangible program storage medium in order to control or execute the operation of a processing system.

A computer-readable medium may be a machine-readable storage device, a machine-readable storage substrate, a memory device, a composition of a material having an effect on a machine-readable electromagnetic signal.

The term "system" or "apparatus" used in the specification includes any instruments, apparatuses, machines for processing data, including, for example, a programmable processor, a computer, a multi-processor, etc. A processing system may include codes forming execution environments for computer programs as requested, such as, for example, codes constructing processor firmware, protocol stacks, a database management system, an operating system, or a combination thereof.

A computer program (also known as a program, software, software application, script or code) can be created in any form of a programming language including a compiled or interpreted language or a priori or procedural language and can be deployed in any form including a stand-alone program, module, component, subroutine or other unit suitably used in computer environments. The computer program does not necessarily correspond to a file of a file system. A program may be stored in a single file provided to a requested program, multiple interacting files (e.g., a file storing some of one or more modules, sub-programs or codes), or a portion of a file retaining other programs or data (e.g., one or more scripts stored in a markup language document). The computer program can be deployed to be executed on a single computer or multiple computers which are located in one site or distributed over a plurality of sites and interconnected by a communication network.

A computer-readable medium suitable to store computer program instructions and data may include any form of nonvolatile memory, medium and memory device, including a semiconductor memory device such as an EPROM, EEPROM and flash memory device, a magnetic disk such as an internal hard disk or external disk, a magneto-optic disk, a CD-ROM, a DVD-ROM disk, etc. A processor and a memory may be supplemented by a special purpose logic circuit or integrated therein.

The subjects described in the specification can be implemented in a processing system including a backend component such as a data server, a middleware component such as an application server, a frontend component such as a client computer having a web browser or graphic user interface which can interact with implementations of the subjects described in the specification, or combinations of the backend component, the middleware component and the frontend component. System components can be interconnected by any form or medium of digital data communication such as a communication network.

The present specification includes details of a number of specific implementations which should not be understood to limit the scope of the invention. Rather, the details of a number of specific implementations should be understood as descriptions on features peculiar to specific embodiments of the present invention. Likewise, specified features described in the context of individual embodiments in the specification may be implemented in combination in a single embodiment. Conversely, a variety of features described in the context of a single embodiment may be implemented individually or in proper sub combination in a plurality of embodiments. Further, although features can be operated in specified combination and initially depicted as claimed, one or more features from the claimed combination may be excluded from the combination in some cases and the claimed combination may be changed to a sub combination or a modification thereof.

In addition, although operations are depicted in a specified order in the drawings, this does not mean that these operations are necessarily performed in the specified order or a procedure shown to obtain a desirable result. In some cases, multitasking and parallel processing may be advantageous. In addition, separation of a variety of system components of the above-described embodiments should not be understood to be required for all of the embodiments. It is to be understood that the described program components and systems may be generally integrated into a single software product or packaged in a multi-software product.

While the present invention has been particularly shown and described with reference to exemplary embodiments thereof, it will be understood by those skilled in the art that various changes in form and details may be made therein without departing from the spirit and scope of the present invention as defined by the appended claims and equivalents thereof. Therefore, the disclosed embodiments have to be construed as not limitative but illustrative. The accompanying claims and their equivalents are intended to cover such forms or modifications as would fall within the scope and spirit of the disclosures.

What is claimed is:

1. A route guidance service apparatus comprising:
a non-transitory memory storing instructions thereon; and
a processor executing the stored instructions to cause the processor to: determine a particular floor in a destination building for a destination by performing a search based on a destination keyword;
determine an output level of the particular floor for display based on building information related to the destination building, the building information including an indoor map of the particular floor; cause the particular floor to be displayed in a second display color different from a first display color used to represent the destination building;
cause a graphical representation of the particular floor to be slid out of a graphical representation of the destination building when the particular floor is selected by a user of the route guidance service apparatus, the graphical representation of the particular floor including the indoor map of the particular floor; and cause the graphical representation of the particular floor to be slid in and a graphical representation of an other floor of the destination building to be slid out and displayed in a third display color different from the first display color and the second display color when the other floor of the destination building is selected by the user.

2. The route guidance service apparatus according to claim 1, wherein the building information further includes a total number of floors for the destination building.

3. The route guidance service apparatus according to claim 1, wherein, when the particular floor is again selected by the user of the route guidance service apparatus, the processor causes the graphical representation of the particular floor to slide into the graphical representation of the destination building.

4. An operation method of a route guidance service apparatus, comprising:
causing a destination building to be displayed in a first display color;
determining a particular floor in the destination building for a destination by performing a search based on a destination keyword;
determining an output level of the particular floor for display based on building information related to the destination building, the building information including an indoor map of the particular floor;
performing a control operation to cause a graphical representation of the particular floor in a second display color different from the first display color to be slid out of a graphical representation of the destination building when the particular floor is selected by a user of the route guidance service apparatus, the graphical representation of the particular floor including the indoor map of the particular floor; and
performing another control operation to cause the graphical representation of the particular floor to be slid in and a graphical representation of an other floor of the destination building selected for the user's navigation to be slid out and displayed in a third display color different from the first display color and the second display color when the other floor of the destination of the building is selected by the user.

5. The operation method according to claim 4, further comprising performing another control operation causing a graphical representation of the particular floor to slide into the graphical representation of the destination building when the particular floor is again selected by the user of the route guidance service apparatus.

6. A route guidance service apparatus comprising:
a non-transitory memory storing instructions thereon; and
a processor executing the stored instructions to cause the processor to: check sensor measurement information of a terminal device;
decide whether or not the terminal device is moved between floors in a building based on the sensor measurement information; and
determine a floor of the building in which the terminal device is located by analyzing an acoustic signal sensed in the terminal device when movement between floors occurs, the acoustic signal emitted by at least one fixed sound source at one of the floors.

7. The route guidance service apparatus according to claim 6, wherein the sensor measurement information includes at least one of horizontal movement information and acceleration information.

8. The route guidance service apparatus according to claim 7, wherein, when an acceleration pattern is observed based on the acceleration information, the processor decides whether or not the terminal device is moved through a stair based on building information related to the building.

9. The route guidance service apparatus according to claim 8, wherein, when the acceleration pattern is not observed, the processor decides that the terminal device is in an elevator when a change in acceleration of the terminal device is checked based on the acceleration information and a change in position of the terminal device in the horizontal direction is not observed based on the horizontal movement information, and wherein, when the acceleration pattern is not observed, the processor decides that the terminal device is on an escalator when a change in position of the terminal device in the horizontal direction is checked and a change in vibration of the terminal device is not observed based on the acceleration information.

\* \* \* \* \*